United States Patent
You et al.

(10) Patent No.: US 12,119,682 B2
(45) Date of Patent: Oct. 15, 2024

(54) METHOD AND APPARATUS FOR CONTROLLING ENERGY STORAGE SYSTEM

(71) Applicant: Contemporary Amperex Technology Co., Limited, Ningde (CN)

(72) Inventors: Ruirui You, Ningde (CN); Xiaowei Yang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 443 days.

(21) Appl. No.: 17/478,887

(22) Filed: Sep. 18, 2021

(65) Prior Publication Data

US 2022/0006304 A1 Jan. 6, 2022

Related U.S. Application Data

(63) Continuation of application No. PCT/CN2020/078251, filed on Mar. 6, 2020.

(30) Foreign Application Priority Data

Mar. 21, 2019 (CN) .......................... 201910216752.4

(51) Int. Cl.
*H02J 7/00* (2006.01)
*G05B 15/02* (2006.01)

(52) U.S. Cl.
CPC ............ *H02J 7/0014* (2013.01); *G05B 15/02* (2013.01); *H02J 7/0042* (2013.01)

(58) Field of Classification Search
CPC ...... G05B 15/02; H02J 7/0014; H02J 7/0018; H02J 7/00308; H02J 7/0042; H02J 7/0048; H02J 7/0016

(Continued)

(56) References Cited

U.S. PATENT DOCUMENTS

2004/0113586 A1* 6/2004 Chen ..................... H02J 7/0019
320/118
2010/0207579 A1* 8/2010 Lee ....................... H02J 7/0018
320/120

(Continued)

FOREIGN PATENT DOCUMENTS

CN 102769316 A 11/2012
CN 102231546 B 7/2013

(Continued)

OTHER PUBLICATIONS

The International Search Report for PCT Application No. PCT/CN2020/078251, dated Jun. 9, 2020, 10 pages.

(Continued)

*Primary Examiner* — Chun Cao
(74) *Attorney, Agent, or Firm* — East IP P.C.

(57) ABSTRACT

An embodiment of this application provides an energy storage system, and a method and an apparatus for controlling the energy storage system. The method includes: selecting a plurality of target modules from all modules contained in an electric cabinet, where a voltage of each of the plurality of target modules is greater than or equal to a voltage of a remaining module; and controlling a DC-DC circuit of the plurality of target modules to increase an output voltage. The technical solution provided in the embodiment of this application can solve the problem that state-of-charge (SOC) imbalance between different modules affects performance of the energy storage system.

6 Claims, 5 Drawing Sheets

(58) Field of Classification Search
USPC .......................................................... 700/287
See application file for complete search history.

(56) References Cited

U.S. PATENT DOCUMENTS

2011/0210701 A1*  9/2011  Nakamura ............ H02J 7/0018
                                                                               320/118
2016/0226268 A1     8/2016  Okui

FOREIGN PATENT DOCUMENTS

| | | | |
|---|---|---|---|
| CN | 103647310 A | * | 3/2014 |
| CN | 105150874 A | | 12/2015 |
| CN | 107482728 A | | 12/2017 |
| CN | 107895983 A | | 4/2018 |
| CN | 108512262 A | | 9/2018 |
| EP | 2362480 A2 | | 8/2011 |
| KR | 20130040346 A | * | 4/2013 |
| KR | 20180051732 A | | 5/2018 |
| WO | 2018184996 A1 | | 10/2018 |
| WO | 2019022378 A1 | | 1/2019 |

OTHER PUBLICATIONS

The First Office Action for Chinese Application No. 201910216752. 4, dated Mar. 16, 2021, 10 pages.
The extended European search report for EP Application No. 20773861.8, dated Feb. 16, 2022, 8 pages.

* cited by examiner

METHOD AND APPARATUS FOR CONTROLLING ENERGY STORAGE SYSTEM

CROSS-REFERENCE TO RELATED APPLICATIONS

This application is a continuation of International Application No. PCT/CN2020/078251 filed on Mar. 6, 2020, which claims priority to Chinese Patent Application No. 201910216752.4, filed on Mar. 21, 2019 and entitled "ENERGY STORAGE SYSTEM, AND METHOD AND APPARATUS FOR CONTROLLING SAME", both of which are incorporated herein by reference in their entireties.

TECHNICAL FIELD

This application relates to the technical field of energy storage, and in particular, to an energy storage system, and a method and an apparatus for controlling the energy storage system.

BACKGROUND

Energy storage systems are now playing an important role in all walks of life. An energy storage system includes an electric cabinet, and the electric cabinet includes a plurality of modules. When a state of charge (SOC) is unbalanced between the modules, a high-SOC module reaches an overvoltage protection threshold first during charging; and a low-SOC module reaches an undervoltage protection threshold first during discharging. This decreases a charge and discharge capacity of the electric cabinet and affects performance of the energy storage system.

SUMMARY

An embodiment of this application provides an energy storage system, and a method and an apparatus for controlling the energy storage system to solve the problem that SOC imbalance between different modules affects performance of the energy storage system.

According to a first aspect, an embodiment of this application provides a method for controlling an energy storage system. The energy storage system includes an electric cabinet. The method includes: selecting a plurality of target modules from all modules contained in the electric cabinet, where a voltage of each of the plurality of target modules is greater than or equal to a voltage of a remaining module; and controlling a DC-DC circuit of the plurality of target modules to increase an output voltage.

According to a second aspect, an embodiment of this application provides an apparatus for controlling an energy storage system. The energy storage system includes an electric cabinet. The apparatus includes: a selection unit, configured to select a plurality of target modules from all modules contained in the electric cabinet, where a voltage of each of the plurality of target modules is greater than or equal to a voltage of a remaining module; and a control unit, configured to control a DC-DC circuit of the plurality of target modules to increase an output voltage.

DESCRIPTION OF DRAWINGS

To describe the technical solutions in the embodiments of this application more clearly, the following outlines the accompanying drawings used in the embodiments. Apparently, the accompanying drawings outlined below are only a part of embodiments of this application. A person of ordinary skill in the art may derive other drawings from these accompanying drawings without making any creative efforts.

DESCRIPTION OF EMBODIMENTS

For better understanding of the technical solutions of this application, the following describes embodiments of this application in detail with reference to accompanying drawings.

It is apparent that the described embodiments are only a part of rather than an entirety of the embodiments of this application. All other embodiments derived by a person of ordinary skill in the art based on the embodiments of this application without making any creative efforts may fall within the protection scope of this application.

The terms used in the embodiments of this application are intended only for describing specific embodiments rather than for limiting this application. Unless otherwise expressly indicated in the context, the words "a", "the", and "this" that precedes a singular noun in the embodiments and claims of this application are intended to include the plural form of the noun.

Understandably, the term "and/or" used herein only describes an association relationship between associated objects and indicates existence of three relationships. For example, "A and/or B" may indicate existence of A alone, coexistence of A and B, and existence of B alone. In addition, the character "I" herein generally indicates an "or" relationship between the object preceding the character and the object following the character.

SBMU: slave battery management unit.
DC-DC circuit: direct current conversion circuit.
CSC: cell supervision circuit.
LDO: low-dropout linear regulator.

Figure 1:
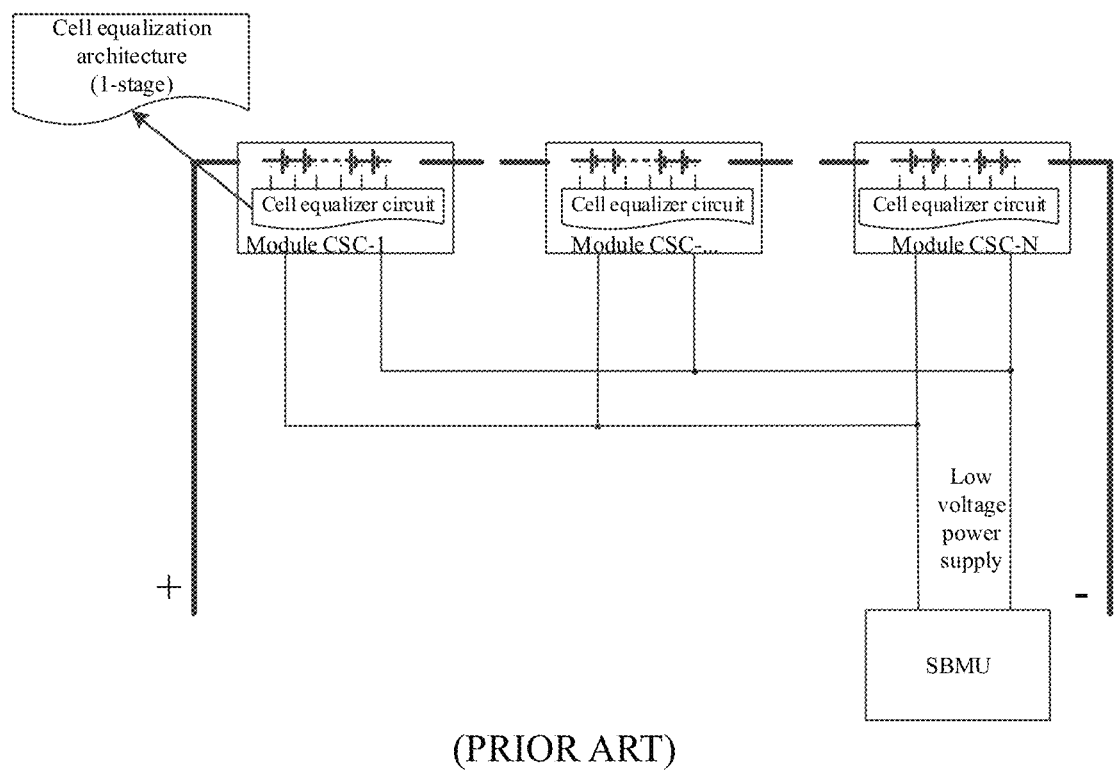
FIG. 1 is a schematic diagram of a hardware architecture of an energy storage system according to related art.

SOC consistency of a battery is an important evaluation indicator for an energy storage system. In the related art, an equalizer circuit is built between battery cells in a single module. As shown in FIG. 1, an active equalizer circuit or a passive equalizer circuit is built in the CSC, so that energy is transferred or consumed in the module to ensure consistency of battery cells in the module. However, when a SOC is unbalanced between the modules, a high-SOC module reaches an overvoltage protection threshold first during charging, and a low-SOC module reaches an undervoltage protection threshold first during discharging. This decreases a charge and discharge capacity of the electric cabinet and affects performance of the energy storage system.

To solve the problem that the SOC imbalance between different modules affects the performance of the energy storage system, an embodiment of this application provides an energy storage system. The energy storage system includes an electric cabinet. The electric cabinet includes an SBMU and a plurality of modules. Each of the plurality of modules is connected to the SBMU. Each of the plurality of modules includes a CSC. Each CSC includes a DC-DC circuit, a low-dropout linear regulator (LDO), and an internal circuit.

Figure 2:
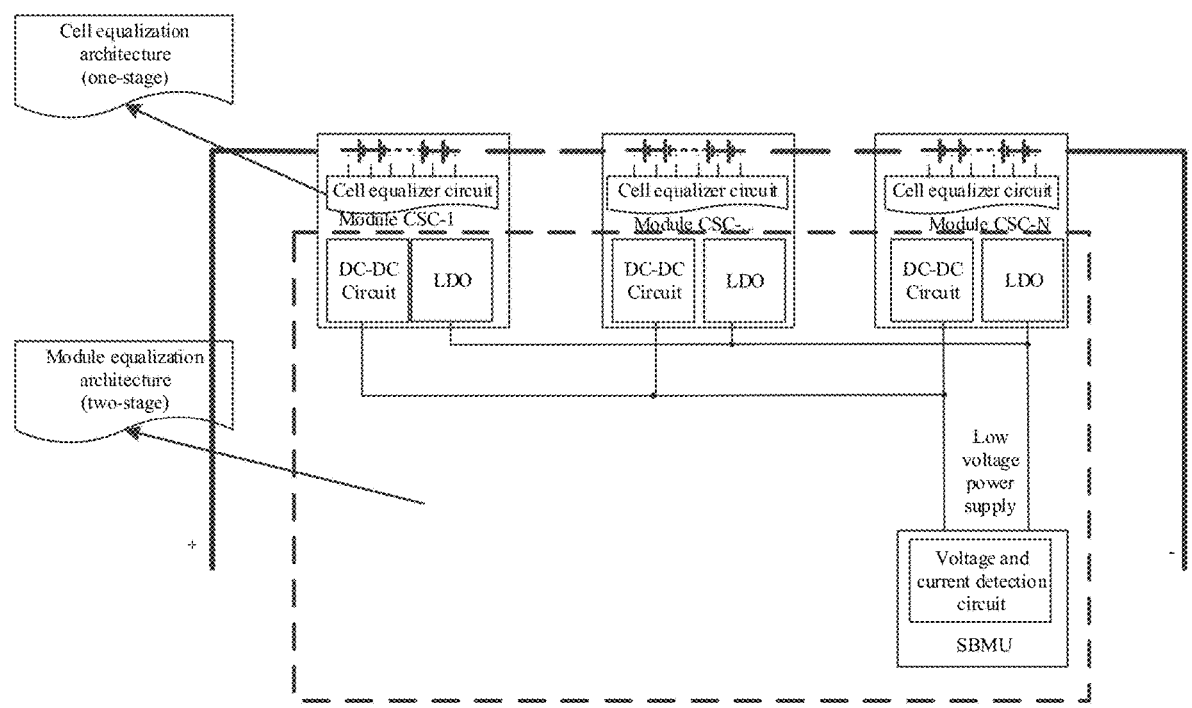
FIG. 2 is a schematic diagram of a hardware architecture of an optional energy storage system according to an embodiment of this application.
Figure 3:
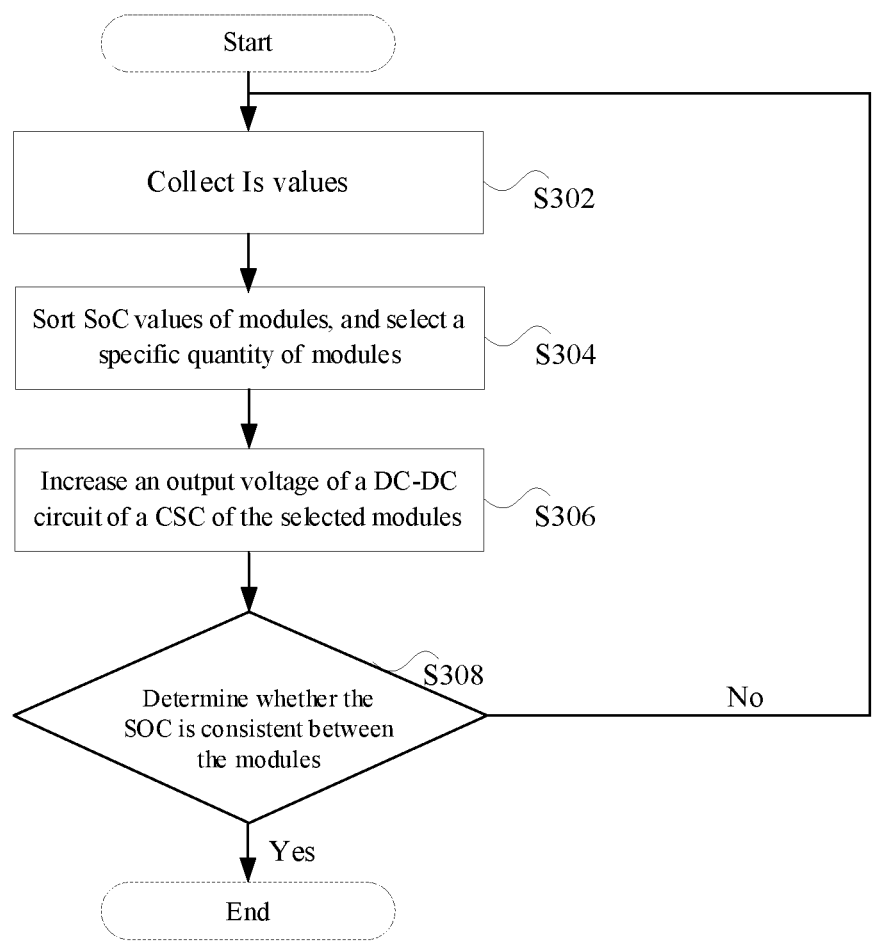
FIG. 3 is a flowchart of an optional two-stage equalization method based on the hardware architecture shown in FIG. 2 according to an embodiment of this application.

In this embodiment of this application, a one-stage equalization method is used in the module to perform equalization within the battery cell, and a two-stage equalization architecture is added between the modules inside the electric cabinet. That is, a DC-DC circuit and an LDO are added in the CSC, as shown in FIG. 2. As shown in FIG. 3, a process of a two-stage equalization method based on the hardware architecture shown in FIG. 2 includes the following steps:

Step S302: Collect Is values (current values of the SBMU);

Step S304: Sort SOC values of the modules, and select a specific quantity of modules (the quantity is determined according to the principle of current balance, which will be expounded below);

Step S306: Increase an output voltage of a DC-DC circuit of a CSC of the selected modules; and Step S308: Determine whether the SOC is consistent between the modules. If the SOC is consistent, the process is ended; if the SOC is not consistent, step S302 is performed until the SOC is consistent between the modules.

Figure 4:
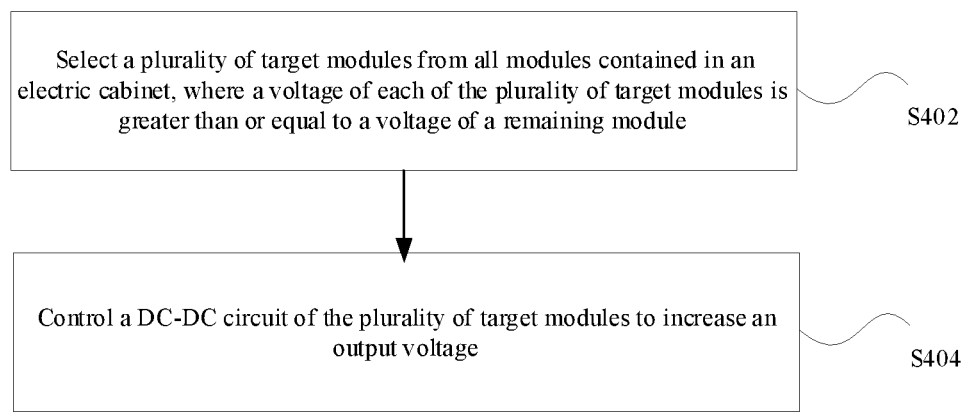
FIG. 4 is a flowchart of an optional method for controlling an energy storage system according to an embodiment of this application.

FIG. 4 is a flowchart of an optional method for controlling an energy storage system according to an embodiment of this application. As shown in FIG. 4, the method includes the following steps.

Step S402: Select a plurality of target modules from all modules contained in the electric cabinet, where a voltage of each of the plurality of target modules is greater than or equal to a voltage of a remaining module.

Step S404: Control a DC-DC circuit of the plurality of target modules to increase an output voltage.

In the embodiments of this application, a plurality of target modules are selected from all modules contained in the electric cabinet. The voltage of each of the plurality of target modules is greater than or equal to a voltage of the remaining module. The DC-DC circuit of the plurality of target modules is controlled to increase the output voltage. The plurality of target modules provide a power supply to the SBMU of the electric cabinet and the CAN transceiver of the CSC of remaining modules, thereby reducing the SOC of the target modules, achieving the effect of balancing the SOC between the modules, and solving the problem that SOC imbalance between different modules affects performance of the energy storage system.

Optionally, the selecting a plurality of target modules from all modules contained in the electric cabinet includes: selecting, according to the principle of current balance, the plurality of target modules from all modules contained in the electric cabinet.

The principle of current balance means that a generated current of the target modules is equal to a current consumed by the entire electric cabinet.

Optionally, the selecting, according to a principle of current balance, the plurality of target modules from all modules contained in the electric cabinet includes: calculating a first quantity according to a quantity of all modules contained in the electric cabinet, a current consumed by a CAN transceiver of a CSC of each module, a maximum power generation current of the CSC of each module, and a current of an SBMU; and determining, if the first quantity is less than a preset quantity threshold, that a quantity of the selected target modules is the preset quantity threshold; or determining, if the first quantity is greater than or equal to a preset quantity threshold, that a quantity of the selected target modules is the first quantity.

Optionally, the calculating a first quantity according to a quantity of all modules contained in the electric cabinet, a current consumed by a CAN transceiver of a CSC of each module, a maximum power generation current of the CSC of each module, and a current of an SBMU includes: calculating the first quantity according to a formula $M=(I1 \times N+Is+const)/I2$, where M denotes the first quantity, I1 denotes the current consumed by the CAN transceiver of the CSC of each module, N denotes the quantity of modules contained in the electric cabinet, Is denotes the current of the SBMU, const denotes a constant, and I2 denotes the maximum power generation current of the CSC of each module.

Several modules in an electric cabinet are generating power, and remaining modules do not generate power. The CAN transceivers of the modules that do not generate power are in a working state and consume current. The CAN transceivers of the power generating modules are also in a working state and also consume current. To achieve a current balance state in the system, a total current generated in an electric cabinet needs to be equal to a total current consumed.

Assuming that the quantity of modules included in an electric cabinet is N, the current consumed by the CAN transceiver of the CSC of each of the N modules is I1, the current consumed by the SBMU is Is, and the current consumed by other devices in the electric cabinet is a constant const, the total current consumed by the electric cabinet is $I1 \times N+Is+const$. In a current balance state, the total current consumed by the electric cabinet is equal to the total current generated by the electric cabinet. Therefore, the total current generated by the electric cabinet is also $I1 \times N+Is+const$. Assuming that all the power generating modules generate power at a maximum power generation current I2, the quantity of power generating modules required is $(I1 \times N+Is+const)/I2$.

Figure 5:
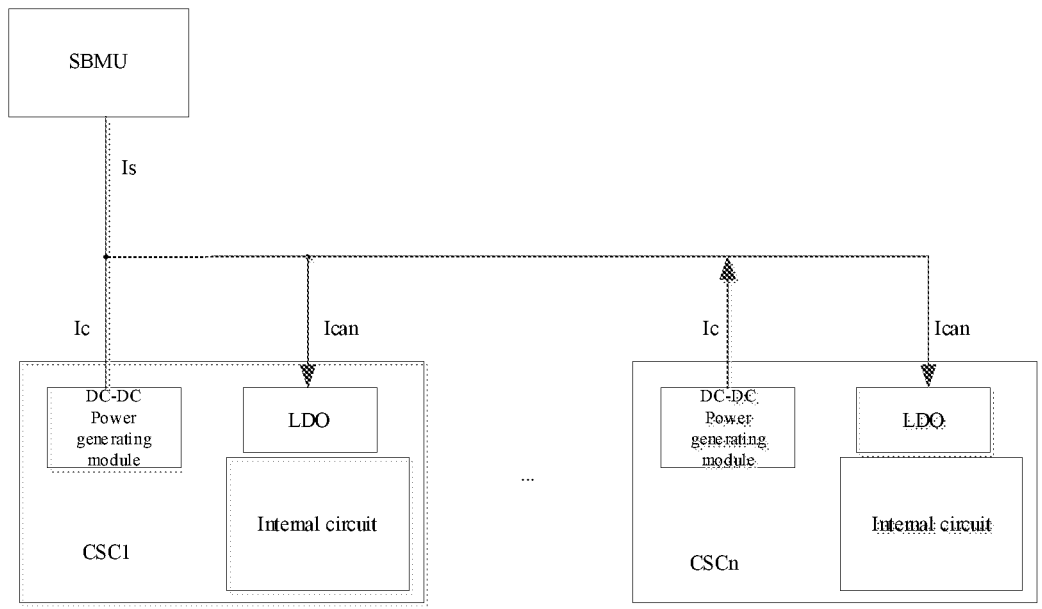
FIG. 5 is a schematic diagram of an optional energy storage system according to an embodiment of this application.

For example, as shown in FIG. 5, Ic (that is, I2) denotes the maximum power generation current of each CSC, and Ican (that is, I1) denotes the current consumed by the CAN transceiver of each CSC. One SBMU corresponds to N CSCs. Generally, the CAN transceiver modules of all the N CSCs are working, and the quantity of CSCs generating power is n, where n is a natural number, and n<N. For example, when Ic=200 mA and Ican=50 mA, assuming that all the power generating modules generate power at the maximum power generation current, then in a current balance state, $200 \times n=50 \times N +150 +Is$, where 150 is the constant const. The value of n is calculated according to the formula $n=(50 \times N +Is+150)/200$. It is assumed that a preset quantity threshold is 5. If n is less than 5, power may be generated by using 5 modules that have a relatively high voltage, and a power generation current of each power generating module is less than the maximum power generation current. If n is greater than or equal to 5, power may be generated by using n modules that have a relatively high voltage, and the power generation current of each power generating module is equal to the maximum power generation current.

Assuming that the power generating modules generate power at a current other than the maximum power generation current I2, the quantity of power generating modules required is greater than (I1×N+Is+const)/I2. For example, assuming that 5 modules are required to generate power in a case that all the power generating modules generate power at the maximum power generation current, then 10 modules are required to generate power in a case that the power generating modules generate power at half of the maximum power generation current.

In determining the quantity of modules required for generating power, the solution is not unique. When a larger quantity of modules are used for generating power, the power generation current of each module is smaller, thereby protecting the modules to some extent. Therefore, the first quantity M is calculated according to the formula M=(I1×N +Is +const)/I2. If the first number M is less than the preset quantity threshold, it is determined that the quantity of the selected target modules is the preset quantity threshold. If the first quantity M is greater than or equal to the preset quantity threshold, it is determined that the quantity of the selected target modules is the first quantity M.

The preset quantity threshold is a user-defined value, and is a natural number such as 5, 6, and so on.

If the first quantity is less than the preset quantity threshold, it is determined that the quantity of the modules for generating power may be a natural number greater than or equal to the preset quantity threshold.

If the first quantity is greater than or equal to the preset quantity threshold, the quantity of the modules for generating power may be a natural number greater than or equal to the first quantity.

Optionally, after controlling the DC-DC circuit of the plurality of target modules to increase the output voltage, the method further includes: reselecting a target module according to a current voltage of the modules; and controlling a DC-DC circuit of the reselected target module to increase the output voltage.

Some electrical power is lost in a power generation process of the modules. Therefore, the power generating modules need to be adjusted in real time. For example, the voltage of the modules is inspected every few seconds, and the modules for generating power are determined according to the updated module voltage until the electrical power is balanced between the modules. For example, it is assumed that the electric cabinet contains a total of 12 modules, and modules 1 to 5 are generating power currently. A few seconds later, the voltages of the 12 modules are inspected and it is found that modules 8 to 12 have the highest voltage. Therefore, the modules 8 to 12 generate power instead, and the modules 1 to 5 stop generating power. A few more seconds later, the voltages of the 12 modules are inspected and it is found that modules 3 to 7 have the highest voltage. Therefore, the modules 3 to 7 generate power instead, and the modules 8 to 12 stop generating power.

In this embodiment of this application, firstly, high-SOC modules (that is, the target modules) need to be selected from the electric cabinet. A specific selection process is: the CSC uploads a real-time voltage value of each module, and the SBMU puts together the real-time voltages of all modules, and sorts the SOCs of all modules in the electric cabinet. In addition, the SBMU monitors a current value in a low-voltage circuit of the SBMU and the CSC to determine the quantity of modules required for generating power.

A power generation method of the CSC of the target modules is: adding a DC-DC circuit at a CSC board level, and adjusting the voltage of the modules to a controllable output voltage. The SBMU may deliver a power generation instruction. Upon receiving the power generation instruction, the CSC of the target module increases the output voltage of the DC-DC circuit so that the CSC discharges electricity to the outside.

The high-SOC modules are selected, a specific circuit is utilized, and the electrical power of the high-SOC modules is consumed to power the SBMU and the CAN transceivers of remaining CSCs, thereby achieving the purpose of consuming the electrical power of the high-SOC modules and balancing the SOC between modules, and effectively solving the problem that the SOC imbalance between modules affects the performance of the energy storage system.

Figure 6:
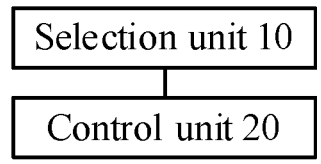
FIG. 6 is a schematic diagram of an optional apparatus for controlling an energy storage system according to an embodiment of this application.

An embodiment of this application further provides an apparatus for controlling an energy storage system. The apparatus for controlling an energy storage system is configured to execute the foregoing method for controlling an energy storage system. As shown in FIG. 6, the apparatus includes: a selection unit 10, and a control unit 20.

The selection unit 10 is configured to select a plurality of target modules from all modules contained in an electric cabinet, where a voltage of each of the plurality of target modules is greater than or equal to a voltage of a remaining module.

The control unit 20 is configured to control a DC-DC circuit of the plurality of target modules to increase an output voltage.

Optionally, the selection unit 10 is configured to select, according to a principle of current balance, the plurality of target modules from all modules contained in the electric cabinet.

Optionally, the selection unit 10 includes a calculation subunit, a first determining subunit, and a second determining subunit. The calculation subunit is configured to calculate a first quantity according to a quantity of all modules contained in the electric cabinet, a current consumed by a CAN transceiver of a CSC of each module, a maximum power generation current of the CSC of each module, and a current of a SBMU. The first determining subunit is configured to determine, if the first quantity is less than a preset quantity threshold, that a quantity of the selected target modules is the preset quantity threshold. The second determining subunit is configured to determine, if the first quantity is greater than or equal to a preset quantity threshold, that a quantity of the selected target modules is the first quantity.

Optionally, the calculation subunit is configured to: calculate the first quantity according to a formula M=(I1×N+ Is+const)/I2, where M denotes the first quantity, I1 denotes the current consumed by the CAN transceiver of the CSC of each module, N denotes the quantity of modules contained in the electric cabinet, Is denotes the current of the SBMU, const denotes a constant, and I2 denotes the maximum power generation current of the CSC of each module.

Optionally, the selection unit 10 is further configured to reselect a target module according to a current voltage of the modules after controlling a DC-DC circuit of the plurality of target modules to increase the output voltage; and the control unit 20 is further configured to control a DC-DC circuit of the reselected target module to increase the output voltage.

The foregoing descriptions are merely exemplary embodiments of this application, but are not intended to limit this application. Any modifications, equivalent substitutions, and improvements made within the spirit and principles of this application may fall within the protection scope of this application.

What is claimed is:

1. A method for controlling an energy storage system, wherein the energy storage system comprises an electric cabinet, and the method comprises:
   selecting a plurality of target modules from all modules contained in the electric cabinet, wherein a voltage of each of the plurality of target modules is greater than or equal to a voltage of a remaining module; and
   controlling a DC-DC circuit of the plurality of target modules to increase an output voltage,
   wherein the selecting of the plurality modules from all modules contained in the electric cabinet comprises:
   calculating a first quantity according to a quantity of all modules contained in the electric cabinet, a current consumed by a controller area network (CAN) transceiver of a cell supervision circuit (CSC) of each module, a maximum power generation current of the CSC of each module, and a current of a slave battery management unit (SBMU); and
   determining, in a case that the first quantity is less than a preset quantity threshold, that a quantity of the selected target modules is the preset quantity threshold; or
   determining, in a case that the first quantity is greater than or equal to a preset quantity threshold, that a quantity of the selected target modules is the first quantity.

2. The method according to claim 1, wherein the calculating a first quantity according to a quantity of all modules contained in the electric cabinet, a current consumed by a CAN transceiver of a CSC of each module, a maximum power generation current of the CSC of each module, and a current of an SBMU comprises:
   calculating the first quantity according to a formula $M=(I1 \times N+Is+const)/I2$, wherein M denotes the first quantity, I1 denotes the current consumed by the CAN transceiver of the CSC of each module, N denotes the quantity of modules contained in the electric cabinet, Is denotes the current of the SBMU, const denotes a constant, and I2 denotes the maximum power generation current of the CSC of each module.

3. The method according to claim 1, wherein after the controlling a DC-DC circuit of the plurality of target modules to increase an output voltage, the method further comprises:
   reselecting a target module according to a current voltage of the modules; and
   controlling a DC-DC circuit of the reselected target module to increase the output voltage.

4. An apparatus for controlling an energy storage system, wherein the energy storage system comprises an electric cabinet, and the apparatus comprises:
   a selection unit, configured to select a plurality of target modules from all modules contained in the electric cabinet, wherein a voltage of each of the plurality of target modules is greater than or equal to a voltage of a remaining module; and
   a control unit, configured to control a DC-DC circuit of the plurality of target modules to increase an output voltage,
   wherein the selection unit comprises:
   a calculation subunit, configured to calculate a first quantity according to a quantity of all modules contained in the electric cabinet, a current consumed by a controller area network (CAN) transceiver of a cell supervision circuit (CSC) of each module, a maximum power generation current of the CSC of each module, and a current of a slave battery management unit (SBMU);
   a first determining subunit, configured to determine, in a case that the first quantity is less than a preset quantity threshold, that a quantity of the selected target modules is the preset quantity threshold; and
   a second determining subunit, configured to determine, in a case that the first quantity is greater than or equal to a preset quantity threshold, that a quantity of the selected target modules is the first quantity.

5. The apparatus according to claim 4, wherein the calculation subunit is configured to:
   calculate the first quantity according to a formula $M=(I1 \times N+Is+const)/I2$, wherein M denotes the first quantity, I1 denotes the current consumed by the CAN transceiver of the CSC of each module, N denotes the quantity of modules contained in the electric cabinet, Is denotes the current of the SBMU, const denotes a constant, and I2 denotes the maximum power generation current of the CSC of each module.

6. An energy storage system, wherein the energy storage system comprises an electric cabinet, and the electric cabinet comprises:
   a slave battery management unit (SBMU); and
   a plurality of modules, each of the plurality of modules being connected to the SBMU, wherein
   each of the plurality of modules comprises a cell supervision circuit (CSC), and each CSC comprises:
   a DC-DC circuit;
   a low-dropout linear regulator; and
   an internal circuit,
   wherein a plurality of target modules are selected from the plurality of modules and a DC-DC circuit of the plurality of target modules is controlled to increase an output voltage, wherein a voltage of each of the plurality of target modules is greater than or equal to a voltage of a remaining module, and
   wherein the plurality of target modules are selected by:
   calculating a first quantity according to a quantity of all modules contained in the electric cabinet, a current consumed by a controller area network (CAN) transceiver of the cell supervision circuit (CSC) of each module, a maximum power generation current of the CSC of each module, and a current of the slave battery management unit (SBMU); and
   determining, in a case that the first quantity is less than a preset quantity threshold, that a quantity of the selected target modules is the preset quantity threshold; or
   determining, in a case that the first quantity is greater than or equal to a preset quantity threshold, that a quantity of the selected target modules is the first quantity.

* * * * *